US008961287B2

(12) United States Patent
Urushihara et al.

(10) Patent No.: US 8,961,287 B2
(45) Date of Patent: Feb. 24, 2015

(54) VIDEO GAME WITH ENHANCED CAPTURE OPPORTUNITIES

(71) Applicant: DeNA Co., Ltd., Tokyo (JP)

(72) Inventors: Daisuke Urushihara, Tokyo (JP); Kazuhiro Yoshimi, Tokyo (JP); Toshihiro Otani, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/251,961

(22) Filed: Apr. 14, 2014

(65) Prior Publication Data

US 2014/0357339 A1 Dec. 4, 2014

(30) Foreign Application Priority Data

May 29, 2013 (JP) ................................ 2013-112484

(51) Int. Cl.
*A63F 13/00* (2014.01)
*G07F 17/32* (2006.01)

(52) U.S. Cl.
CPC .................................... *G07F 17/329* (2013.01)
USPC ........................ 463/10; 463/7; 463/9; 463/43

(58) Field of Classification Search
CPC . A63F 13/10; A63F 2300/60; A63F 2300/64; A63F 2300/65; A63F 2300/609; A63F 2300/5533; A63F 2300/5546; A63F 2300/8058
See application file for complete search history.

(56) References Cited

U.S. PATENT DOCUMENTS 6,302,792 B1 * 10/2001 Arai et al. ..................... 463/23
6,371,856 B1 * 4/2002 Niwa ............................. 463/43
2004/0204212 A1 * 10/2004 Sato ............................. 463/5
2012/0309480 A1 * 12/2012 Kashitani ...................... 463/8
2013/0079155 A1 * 3/2013 Kashitani ...................... 463/43

FOREIGN PATENT DOCUMENTS

JP 2005-224523 A 8/2005

OTHER PUBLICATIONS

Japanese Patent Application No. 2013-112484, Office Action dated Nov. 6, 2013.
Japanese Patent Application No. 2013-112484, Decision to Grant Patent, dated Dec. 24, 2013.

* cited by examiner

*Primary Examiner* — Lawrence Galka
(74) *Attorney, Agent, or Firm* — Procopio, Cory, Hargreaves & Savitch LLP

(57) ABSTRACT

A server device selects by lot one event from among a plurality of events including an encounter event with an enemy character present in a predetermined area in a network game, accepts from a user a command indicating action taken on the enemy character, when the encounter event is selected by lot, performs a process on the enemy character, based on the accepted command, and stores a status of the enemy character obtained after processed. In addition, the server device selects by lot an encounter event for re-encountering an enemy character encountered in past, with a predetermined probability, reads from a memory a status of the re-encountered enemy character obtained at a past encounter, and sets the status as an initial status of the re-encountered enemy character.

8 Claims, 12 Drawing Sheets

230

| MONSTER INFORMATION | RARITY VALUE | ATTRIBUTE VALUE | INITIAL ATTACK VALUE | INITIAL HIT POINT VALUE | UPDATED HIT POINT VALUE | STATUS |
|---|---|---|---|---|---|---|
| MONSTER A | COMMON | FIRE | 20 | 30 | 10 | NORMAL |
| MONSTER B | RARE | WATER | 40 | 100 | 70 | POISON |
| : | | | | | | |
| : | | | | | | |

FIG. 3

210

| USER NAME | USER IDENTIFICATION INFORMATION | LEVEL | PROGRESS INFORMATION | POSSESSED CARD IDENTIFICATION INFORMATION | | ... |
|---|---|---|---|---|---|---|
| P1 | P001 | 10 | STAGE 2 | C001, C003 | | ... |
| P2 | P002 | 14 | STAGE 3 | C001, C003, C006 | | ... |
| P3 | P003 | 20 | STAGE 5 | C001, C005, C007, C009 | | ... |
| P4 | P004 | 3 | STAGE 1 | C002 | | ... |
| ... | ... | ... | ... | ... | ... | ... |

FIG. 4

220

| CARD IDENTIFICATION INFORMATION | NAME | RARITY VALUE | INITIAL ATTACK VALUE | INITIAL HIT POINT VALUE | | ATTRIBUTE VALUE | ... |
|---|---|---|---|---|---|---|---|
| C001 | KNIGHT A | UNCOMMON | 15 | 40 | | LIGHT | ... |
| C002 | KNIGHT B | COMMON | 10 | 35 | | WATER | ... |
| C003 | KNIGHT C | UNCOMMON | 20 | 35 | ... | FIRE | ... |
| C004 | SAMURAI A | RARE | 120 | 70 | | EARTH | ... |
| C005 | SAMURAI B | UNCOMMON | 70 | 50 | ... | EARTH | ... |
| C006 | NINJA A | RARE | 100 | 50 | | DARKNESS | |
| C007 | NINJA B | UNCOMMON | 35 | 20 | ... | WATER | ... |
| C008 | WIZARD A | UNCOMMON | 30 | 20 | | FIRE | |
| C009 | WIZARD B | COMMON | 20 | 10 | ... | WATER | ... |
| C0010 | MONK | SUPER RARE | 150 | 200 | | EARTH | |
| ... | ... | ... | ... | ... | ... | ... | ... |
| ... | ... | ... | ... | ... | ... | ... | |
| ... | ... | ... | ... | ... | ... | ... | ... |

FIG. 5

230

| MONSTER INFORMATION | RARITY VALUE | ATTRIBUTE VALUE | INITIAL ATTACK VALUE | INITIAL HIT POINT VALUE | UPDATED HIT POINT VALUE | STATUS |
|---|---|---|---|---|---|---|
| MONSTER A | COMMON | FIRE | 20 | 30 | 10 | NORMAL |
| MONSTER B | RARE | WATER | 40 | 100 | 70 | POISON |
| : | | | | | | |
| : | | | | | | |

VIDEO GAME WITH ENHANCED CAPTURE OPPORTUNITIES

BACKGROUND OF THE INVENTION

1. Field of the Invention

The present invention relates to a game processing technique using a computer.

2. Description of Related Art

In recent years, social games which use an SNS (Social Networking Service) and in which a plurality of users participate through a network have widely spread, and network games have been provided in which by users performing communication with a game server using information processing devices such as PC (Personal Computer) terminals or portable terminals, they exchange each other's information and perform communication with each other.

Of such network games, some games in which a player encounters an enemy character and does battle with the enemy character allow the player to attempt to capture the enemy character during the encounter with the enemy character. Normally, whether the capture of the enemy character has been succeeded is determined probabilistically. If the capture of the enemy character has been succeeded, the enemy character can be allowed to appear in the game as a friend character possessed by the player.

For example, JP 2005-224523 A discloses that a determination as to whether a capture condition is satisfied is performed in accordance with the random probability according to the type of the last attack operation used by the player against the enemy character.

SUMMARY OF THE INVENTION

A game such as that described above in which an enemy character can be captured has become popular; however, in terms of enhancing the game's strategic element by increasing the number of variations of action taken by the player to succeed in capturing, there is room for a further improvement.

The present invention is made in view of such problems, and an object of the present invention is therefore to provide a server device, a method, and a non-transitory computer-readable storage medium storing a game program that can enhance the game's strategic element in a game in which an enemy character can be captured.

An aspect of the present invention relates to a server device. The server device provides a predetermined network game to a user through a communication line, and includes: an event lottery unit that selects by lot one event from among a plurality of events including an encounter event with an enemy character present in a predetermined area in the network game; a command accepting unit that accepts from the user a command indicating action taken on the enemy character, when the encounter event is selected by lot by the event lottery unit; a game processing unit that performs a process on the enemy character, based on the command accepted by the command accepting unit; and a memory that stores a status of the enemy character obtained after processed by the game processing unit. The event lottery unit selects by lot an encounter event for re-encountering an enemy character encountered in past, with a predetermined probability. The game processing unit reads from the memory a status of the re-encountered enemy character obtained at a past encounter, and sets the status as an initial status of the re-encountered enemy character.

According to such an aspect, a status of a re-encountered enemy character obtained at a past encounter is read from the memory, and the status is set as the initial status of the re-encountered enemy character. This reduces the chance of letting a high-rarity enemy character that the user has not been able to defeat in one turn get away, enabling to further increase the probability of the user being able to defeat the enemy character. By this, the user can get a plurality of attack opportunities or capture opportunities, and also the number of opportunities to acquire enemy characters increases, enabling to further enhance the game's strategic element.

In addition, the server device further includes a capture determining unit that determines, according to a predetermined capture success rate, whether capture of the enemy character has been succeeded, when the command accepting unit accepts a capture command from the user. The capture determining unit may set a higher capture success rate for a re-encounter than a capture success rate for a first encounter.

According to such an aspect, by setting a higher capture success rate for a re-encounter than a capture success rate for the first encounter, the chance of capturing an enemy character increases, enabling to further enhance the game's strategic element.

In addition, when the command accepting unit accepts an attack command from the user, the game processing unit may reduce hit points of the enemy character, according to attack action, the memory may store the hit points of the enemy character obtained after attacked, and the capture determining unit may determine a higher capture success rate for fewer hit points of the enemy character.

According to such an aspect, a higher capture success rate is determined for fewer hit points of an enemy character. This enables to efficiently acquire an enemy character whose hit points which are the remaining hit points are reduced and thus is weakened, by strategically using a plurality of attack opportunities given to the user. Accordingly, the game's strategic element can be further enhanced.

In addition, when the command accepting unit accepts a status abnormality command from the user, the capture determining unit may change a capture success rate of the enemy character, according to the status abnormality.

According to such an aspect, the capture success rate of an enemy character is changed according to a status abnormality. This enables to efficiently acquire an enemy character weakened by a status abnormality. Accordingly, the game's strategic element can be further enhanced.

In addition, the game processing unit may perform, when the user uses an extension item for extending a quest after ending a quest in the area or when the user uses the extension item during the quest in the area, an extension process for the quest in the area. In addition, the game processing unit may bring a status of an enemy character that the user has encountered in the quest back to a status obtained before starting the quest, when the extension item is not used or the extension process ends, the status of the enemy character being stored in the memory.

According to such an aspect, when a game area is cleared, the status of an enemy character encountered in the game area is cleared to its default. Therefore, when there is an enemy character hunted down in the game area, by the user extending the quest, he/she can get an opportunity to capture the enemy character in a more advantageous state.

In addition, when the command accepting unit accepts an attack command from the user, the game processing unit may cause a status abnormality in the enemy character with a predetermined probability, and the capture determining unit may change a capture success rate of the enemy character, according to the status abnormality.

According to such an aspect, an enemy character weakened by a status abnormality can be efficiently acquired. Accordingly, the game's strategic element can be further enhanced.

In addition, for a re-encounter, the capture determining unit may set a higher capture success rate for shorter time elapsed since a last encounter.

According to such an aspect, for a re-encounter, a higher capture success rate is set for shorter time elapsed since the last encounter. This can encourage the user to actively participate in the game. Accordingly, the game's strategic element can be further enhanced.

In addition, when a plurality of enemy characters are present in the area, the memory may store an encountered enemy character, and the event lottery unit may set a probability of selecting by lot an encounter event with each enemy character, according to a number of encounters.

According to such an aspect, when a plurality of enemy characters are present, an encountered enemy character is stored, and the event lottery unit sets the probability of selecting by lot an encounter event with each enemy character, according to the number of encounters. This increases the opportunity to re-encounter. By this, the user can get a plurality of attack opportunities, and also the number of opportunities to acquire enemy characters increases, enabling to further enhance the game's strategic element.

In addition, another aspect of the present invention is directed to a method. The method is to provide a predetermined network game to a user, and includes: selecting by lot one event from among a plurality of events including an encounter event with an enemy character present in a predetermined area in the network game; accepting from the user a command indicating action taken on the enemy character, when the encounter event is selected by lot; performing a process on the enemy character, based on the accepted command; and storing a status of the enemy character obtained after processed. In the selection-by-lot, an encounter event for re-encountering an enemy character encountered in past is selected by lot with a predetermined probability. In the processing, a status of the re-encountered enemy character obtained at a past encounter is read from the memory, and the status is set as an initial status of the re-encountered enemy character.

In addition, a still another aspect of the present invention is directed to a non-transitory computer-readable storage medium storing a game program. The non-transitory computer-readable storage medium storing a game program is to provide a predetermined network game to a user and cause a computer to perform: selecting by lot one event from among a plurality of events including an encounter event with an enemy character present in a predetermined area in the network game; accepting from the user a command indicating action taken on the enemy character, when the encounter event is selected by lot; a process on the enemy character, based on the accepted command; and storing a status of the enemy character obtained after processed. In the selection-by-lot, an encounter event for re-encountering an enemy character encountered in past is selected by lot with a predetermined probability. In the processing, a status of the re-encountered enemy character obtained at a past encounter is read from the memory, and the status is set as an initial status of the re-encountered enemy character.

Note that any combination of the above-described components and a method, a device, a system, a computer program, etc., into which the representation of the present invention is converted are also effective as the aspects of the present invention.

According to the present invention, the game's strategic element can be enhanced and thus the zest for the game can be improved.

BRIEF DESCRIPTION OF THE DRAWINGS

FIG. 3 is a diagram illustrating an example of a user information table managed by a user information managing unit of FIG. 2;

FIG. 4 is a diagram illustrating an example of a card information table managed by the user information managing unit of FIG. 2;

FIG. 5 is a diagram illustrating an example of a monster information table managed by the user information managing unit of FIG. 2;

DETAILED DESCRIPTION OF THE INVENTION

Figure 1:
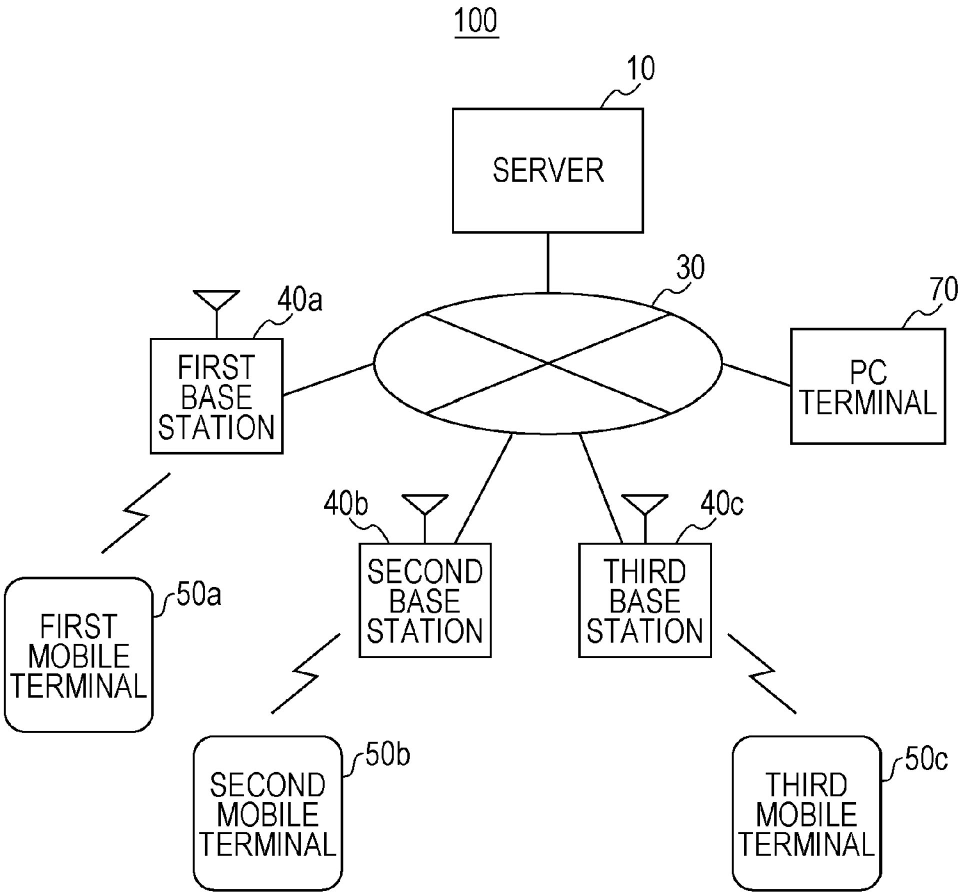
FIG. 1 is a diagram illustrating an exemplary configuration of a social game system according to a first embodiment.

Before describing an embodiment of the present invention, first, a summary of the present invention will be described. The present invention relates to a technique for enhancing the game's strategic element by increasing the number of variations of action taken by a player to succeed in capturing in a game in which an enemy character can be captured.

In putting down or capturing (hereinafter, also referred to as conquering) an enemy character in a conventional game, even if a user has hunted down an enemy character to the brink of conquer, once the battle has ended, even if the user has re-encountered the same enemy character, he/she needs to conquer the enemy character all over again. Therefore, the conquer difficulty level is significantly high for high-rarity enemy characters and characters with lots of hit points, which is one of the factors in reducing the zest for the game.

In addition, a nearly-conquered enemy character is considered to be close to a dead status. However, even if the user has encountered the same enemy character after the battle, since the status of the enemy character has been back to its original one, there may be lots of users feeling a sense of strangeness.

In the present invention, the above-described problems are solved. Since another battle with a re-encountered enemy character starts using a status of the enemy character obtained upon the end of the last battle, the user can play the game while feeling a sense of reality. In addition, since the user is given a chance to re-encounter a missed enemy character, the number of options for conquer to be selected by the user for each battle can be increased. Accordingly, the game's strategic element and the zest for the game can be enhanced.

The present invention will be described below using an example in which the present invention is applied to a network game, particularly, a social game.

Now, a social game will be briefly described. A social game generally refers to application game software that uses a platform such as an API (Application Programming Interface) which operates on a web browser using SNS information, and operates based on the platform. In the following, the social game is simply referred to as a browser game.

Some social games are played such that SNS information is used but an application program is downloaded to each terminal device operated by a user, and the application program is executed in each terminal device, and various types of parameters are transmitted and received between each terminal device and a server device. In the following, such social games are simply referred to as application games.

Note that an example described below is provided to understand the present invention, and thus, the technical scope of the present invention is not limited thereto. The following processes which are an example of the present invention can be processed by a server device that provides a game as a browser game, and can also be processed by a program that is executed on the terminal device side as an application game. In addition, the following processes which are an example of the present invention can also be executed on a stationary game machine and a game machine that does not have a network function.

[First Embodiment]

First, a first embodiment will be described. FIG. 1 is a diagram illustrating a social game system 100 according to the first embodiment of the present invention. The social game system 100 includes a server device 10; a network 30 that connects the server device 10 to base stations 40 by wired lines; a first base station 40*a* to a third base station 40*c* which are represented by a base station 40; a first mobile terminal 50*a* to a third mobile terminal 50*c* which are represented by a mobile terminal 50; and a PC terminal 70.

Note that although only three base stations 40 and three mobile terminals 50 are illustrated for convenience of depiction, the configuration is not limited thereto, and there may be more base stations 40 and more mobile terminals 50. The same also applies to the PC terminal 70. Note also that although the drawing illustrates that the first mobile terminals 50*a* to the third mobile terminals 50*c* are connected to different base stations 40, the configuration is not limited thereto, and even if a plurality of mobile terminals 50 are connected to one base station 40, needless to say, the present invention is applicable.

The server device 10 is a device for performing and providing social game services. The server device 10 performs a communication process for game processing with the mobile terminals 50 or the PC terminal 70 through the network 30 and the base stations 40. Note that in the following, for simplification of description, such a communication process is simply expressed as, for example, "a communication process is performed between the server device 10 and the mobile terminals 50 or the PC terminal 70", and the description "through the network 30 and the base stations 40" is omitted. Note also that in the following the mobile terminals 50 and the PC terminal 70 may be collectively represented as user terminals. Note also that the server device 10 may be a platform that provides services related to a network game, or may be a server that provides an application for a network game.

The server device 10 manages the start and progress of a game. Upon progress, the server device 10 selects by lot one event from among a plurality of events. Selection of an event by lot uses a predetermined probability. In addition, the server device 10 creates a battle screen taking into account user information, information on an enemy character that a user has encountered, etc., and displays the battle screen on the screen of a user terminal.

The user terminal performs a game by accessing the server device 10 through a communication line. After the start of the game, an owner of the user terminal performs a predetermined input process according to a message, an image, etc., displayed on the screen of the user terminal Thereafter, information about the input process performed by the user is passed to the server device 10 from the user terminal The server device 10 performs a process according to the information, and allows the user terminal to display a predetermined image, etc.

Figure 2:
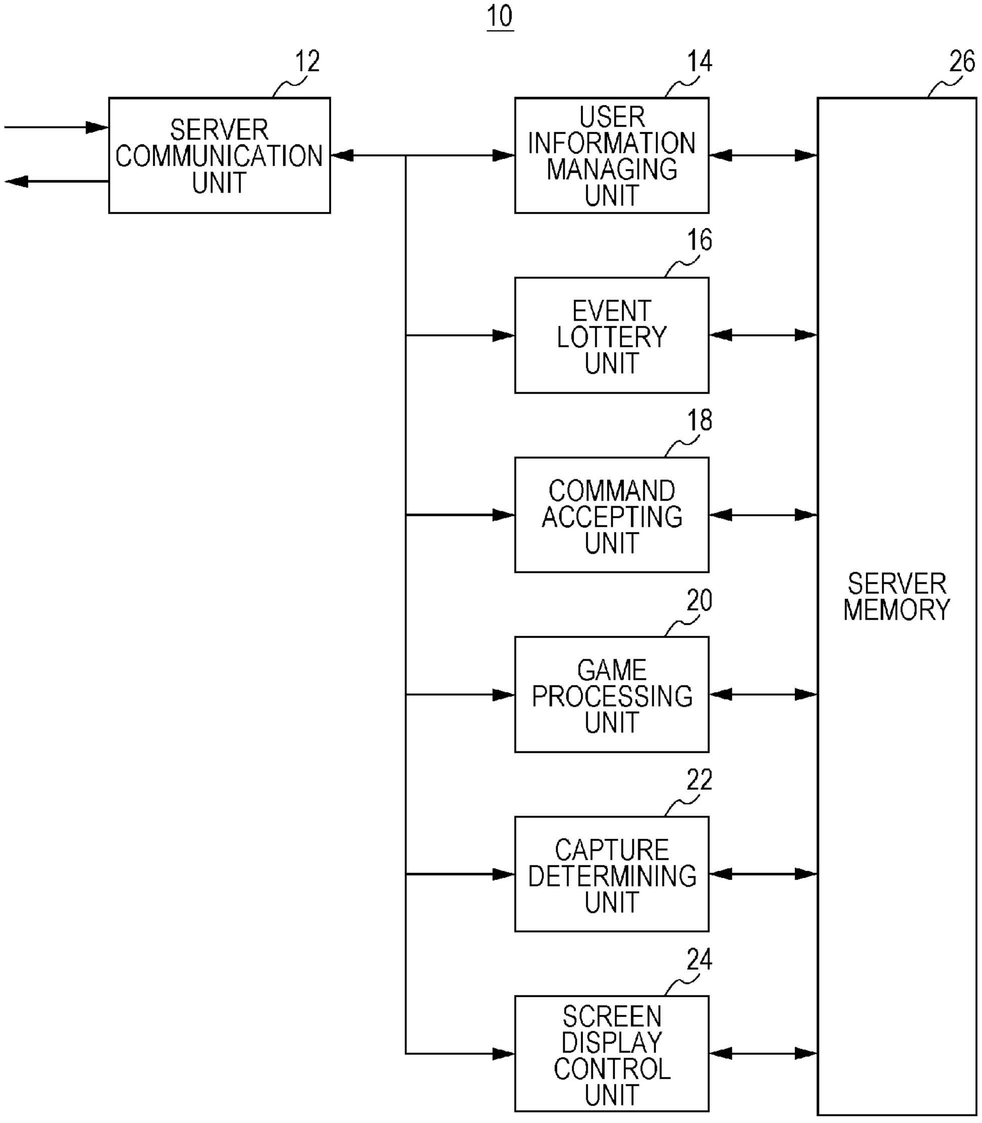
FIG. 2 is a diagram illustrating an exemplary configuration of a server device of FIG. 1.

FIG. 2 is a diagram illustrating an exemplary configuration of the server device 10 of FIG. 1. The server device 10 includes a server communication unit 12, a user information managing unit 14, an event lottery unit 16, a command accepting unit 18, a game processing unit 20, a capture determining unit 22, a screen display control unit 24, and a server memory 26.

The server communication unit 12 receives a signal from a user terminal and performs a predetermined demodulation process on the signal and then transmits the demodulated signal to the user information managing unit 14, the event lottery unit 16, the command accepting unit 18, the game processing unit 20, the capture determining unit 22, and the screen display control unit 24.

In addition, the server communication unit 12 receives an instruction from the game processing unit 20 or the screen display control unit 24 and performs a modulation process on predetermined data and then transmits the modulated data to the user terminal. The predetermined data includes, for example, an image related to the game, information on a monster appearing in the game, etc.

Note that, for the modulation and demodulation processes performed by the server communication unit 12, conventionally used modulation and demodulation techniques may be used, and it is to be understood by those skilled in the art that even in such a mode the present invention can be applied.

The user information managing unit 14 manages, in the server memory 26, information on users registered in the social game system 100. The information on the users includes user identification information, user names, avatar image information, comments inputted by the users. These pieces of information on the users are referred to by the game processing unit 20, etc.

The server memory 26 stores information about a game, in addition to the information on the users. The information about the game includes card information used in the game and includes, for each user, identification information of a game performed, the date and time when the game is performed, the number of times the game is performed, progress status, identification information of items obtained in the game and acquired monsters, and identification information of monsters encountered in the game, etc. These pieces of information are referred to by the game processing unit 20, the capture determining unit 22, or the screen display control unit 24. In addition, the server memory 26 stores the statuses of enemy characters obtained after processed by the game processing unit 20, which will be described later.

The event lottery unit 16 performs a selection-by-lot process in a predetermined area where the game is performed (hereinafter, referred to as a game area), to select one event from a plurality of events. The events include an encounter event with an enemy character, a treasure finding event where an item or in-game currency is provided, a raid boss event where a boss is defeated in cooperation with another player, a battle event with another player, an event where nothing occurs, etc. Each event is selected according to a lottery probability set for each event.

When an encounter event with an enemy character is selected, the event lottery unit 16 selects one of enemy characters present in the game area. In this selection, the event lottery unit 16 accesses the server memory 26 to set, according to the number of encounters, the probability of selecting by lot an encounter event with each enemy character. Namely, the user is more likely to re-encounter an enemy character that he/she has encountered once.

When an encounter event is selected by lot by the event lottery unit 16, the command accepting unit 18 accepts from the user a command indicating action taken on an encountered enemy character. The commands include an attack command, a capture command, a getaway command, and a special skill command.

The attack command is a command for attacking the encountered enemy character and reducing the hit points of the enemy character. The hit points are an integer value indicating hit points. When the attack command is accepted, the command accepting unit 18 allows the game processing unit 20 to perform an attack process. Damage that can be done to a monster in the attack process is determined by the power of a friend character. The power includes, for example, attack strength, defense strength, HP, and speed, and some or all of them may affect the damage done to the enemy character.

The capture command is a command for capturing the encountered enemy character. When the capture command is accepted, the command accepting unit 18 allows the capture determining unit 22 to determine whether capture has been succeeded. When capture has been succeeded, the captured enemy character is stored in the server memory 26, as a user's friend character, and thereafter the user can use the character as his/her friend character in the game.

The getaway command is a getaway command for getting away from the encountered enemy character, or a command that lets the encountered enemy character get away. When the getaway command is accepted, the command accepting unit 18 compares a user's character with the enemy character to determine whether the user's character can get away. When the user's character can get away, the encounter event ends. When the user's character cannot get away, the battle continues. On the other hand, when the let-get-away command is accepted, the command accepting unit 18 unconditionally ends the battle.

The special skill command is a command for the user to use a selectable special skill in the game. Special skills include one that brings an enemy character to a status abnormality, one that recovers the hit points of a character used by the user, etc. Status abnormalities include a poisoned status, a confused status where an enemy character itself attacks him/herself, etc.

These status abnormalities have different degrees of effect, depending on the attribute(s) of the enemy character. When the effect is great, the enemy character is likely to go into a status abnormality. When the effect is small, even if the user uses a special skill to bring the enemy character to a status abnormality, the enemy character may not go into the status abnormality. Note that a status abnormality may probabilistically occur in the enemy character even when an attack command is selected. This probability may be determined by the chemistry between the attribute(s) of the enemy character and the status abnormality.

The game processing unit 20 accepts a request to start a game that can be performed on the social game system 100, from the user terminal through the server communication unit 12, and then starts the game. After the start of the game, the game processing unit 20 accepts from the user an instruction to select a game area. Thereafter, the game processing unit 20 manages the progress of the game in the accepted game area. In addition, upon the progress of the game, the game processing unit 20 accesses user information and card management data which are stored in the server memory 26, to perform a predetermined process.

The game processing unit 20 receives the result of selection by lot performed by the event lottery unit 16, and notifies the user terminal of information about the result of selection by lot, in synchronization with the screen display control unit 24. For example, when an encounter event with an enemy character is selected, the game processing unit 20 accesses the server memory 26 to read the parameters of the selected enemy character, and notifies the user terminal of the parameters of the enemy character. Note that when the encounter with the enemy character is a re-encounter, the game processing unit 20 reads from the server memory 26 a status of the re-encountered enemy character obtained at a past encounter, and sets the status as the initial status of the re-encountered enemy character.

Note that when the game area is cleared, the game processing unit 20 clears the status of an enemy character encountered in the game area. Therefore, even if the same enemy character is encountered in a different game area, it is treated as the first encounter.

Note also that the game processing unit 20 performs a process on the enemy character, based on a command accepted by the command accepting unit 18. When the command accepted from the user is an attack command, the game processing unit 20 reduces the hit points of the enemy character according to attack action, and stores the reduced hit points in the server memory 26 in association with the user. When the hit points of the enemy character reach 0, the game processing unit 20 causes the enemy character to disappear. When the user's hit points reach 0, the game processing unit 20 performs the process of ending the game.

When the command accepting unit 18 accepts a capture command from the user terminal, the capture determining unit 22 determines, according to a predetermined capture success rate, whether the capture of the enemy character has been succeeded. When the capture has been succeeded, the user can allow the obtained enemy character to participate in a battle as his/her friend character, or can sell the obtained enemy character, or can use the obtained enemy character as a material for fusion, or can trade off the obtained enemy character.

A higher capture success rate may be determined for fewer hit points of the enemy character. Alternatively, the capture success rate may be calculated using one or more of the elements such as the strengths of a character and a deck (attack strength, defense strength, HP, and speed), the number of encounters with the enemy character, and the number of combos. Note that the combo is a flag that holds by another player attacking the same monster within a fixed period of time after a player attacks the monster.

Alternatively, a higher capture success rate may be set for a re-encounter than that for the first encounter. Alternatively, the capture success rate of the enemy character may be changed according to the status abnormality. In this case, the difference in effect caused by the chemistry between the attribute(s) of the enemy character and the status abnormality may be reflected on the capture success rate. The above-described elements may be set such that the more the conditions are met the higher the capture success rate. The capture success rate may be set by different calculation methods for a normal enemy character and a boss character.

The screen display control unit 24 performs control to display a predetermined image on the screen of the user terminal, according to the progress of the game or in response to an instruction from the game processing unit 20. The screen display control unit 24 performs control to access the server memory 26 to read image information of a selected enemy character, transmit the image information to the user terminal, and display the image information on the screen of the user terminal.

FIG. 3 is a diagram illustrating an example of a user information table 210 managed in the server memory 26 by the user information managing unit 14 of FIG. 2. As exemplified in the user information table 210 of FIG. 3, the server memory 26 may have data in table format. Here, the user name may be a user name on the SNS or may be the name of a user set for each game.

The user identification information is a unique code for identifying a user. The level is a user level that sequentially increases based on the number of participations in the game and obtained experience points. The progress status is information indicating how far the game has progressed by each user. The possessed card identification information is various types of card identification information such as character cards that can be used in a battle by the user.

FIG. 4 is a diagram illustrating an example of a card information table 220 managed in the server memory 26 by the user information managing unit 14 of FIG. 2. As exemplified in the card information table 220 of FIG. 4, the server memory 26 may have data in table format as card management data. In the card information table 220, the name indicates the name of a card itself or a character shown on the card. The rarity value indicates the degree of the rarity value of the card, and is divided into ranks such that rarity increases step by step, e.g., common, uncommon, rare, and super rare. The initial attack value is the initial attack value of the character in a team battle, and the initial hit point value is the initial value of the hit points of the character in a team battle. Since these values are initial values, the values change every time the character is evolved or reinforced by repeating battles.

FIG. 5 is a diagram illustrating an example of a monster information table 230 managed in the server memory 26 by the user information managing unit 14 of FIG. 2. As illustrated in the monster information table 230 of FIG. 5, the server memory 26 stores, for each monster which is an enemy character, monster information, rarity value, initial attack value, updated hit point value, status information, etc. The updated hit point value is the hit points of the monster updated by the game processing unit 20 after a battle, and is a value less than or equal to the initial hit point value. The status is "normal", "poison", etc., indicating the status of the monster after the battle. After the start of the game, for an enemy character that has not encountered a user's character, the same value as the initial hit point value is set as the updated hit point value, and the status is set to "normal".

Now, description of the progress of the game will be made using FIGS. 6 to 8. Note that for easy understanding user terminal's screen displays are used, and the screen displays are generated by the screen display control unit 24 based on instructions from the event lottery unit 16, the command accepting unit 18, the game processing unit 20, and the capture determining unit 22 of the server device 10, and are displayed on the screen of the user terminal. Note also that although the following embodiment is described assuming that input operations are performed on a touch panel which is the screen of the terminal, operations such as mouse operations may also be performed.

First, the flow of the game will be briefly described. When the user selects "quest" on my page by operating the user terminal, the entire map is displayed. On the entire map, a plurality of game areas are displayed. When the user selects any one of the game areas, a pop-up screen for selecting a character is displayed. After the selection of a character, "quest" starts. After the start of the quest, the character moves forward from the entrance to exit of the game area, according to a player's operation (e.g., pressing the "MOVE" button displayed on the user terminal). In the course of moving forward to the exit, selection of an event by lot is performed by the event lottery unit 16 of FIG. 2.

As a result of the selection of an event by lot, the user obtains in-game currency or acquires a recovery item or finds a treasure box or encounters a monster (enemy character) or no event occurs. When an encounter event with an enemy character is selected by lot, a battle with the enemy character starts, and the user selects one command from selectable commands. When a capture command is selected during the battle, capture of the enemy character such as that described above is attempted. After the battle ends, selection of an event by lot is repeated until reaching the exit.

In the game of the present embodiment, there is a possibility of selecting by lot an event where the user re-encounters an enemy character that he/she has met before. In this case, if the hit points of the enemy character have been reduced by damaging the enemy character by attack at the last encounter with the enemy character, then the enemy character at the re-encounter appears, being damaged. Alternatively, if a status abnormality has been caused by a special skill command, then a monster with the status abnormality appears.

When the player encounters a monster having such a status, he/she succeeds in capturing with a higher probability. Note that information indicating that the player has met a monster (damage or a status abnormality given to the monster) is held only while the player is present in the game area. Hence, the player needs to develop a strategy as to whether to attempt to capture a monster that the player has encountered for the first time, or whether to do some damage to such a monster and then challenge to capture the monster next time when the player encounters the monster. In the latter case, although the capture success rate is certainly high, the player takes the risk that the stage may be cleared with no chance for the player to re-encounter the monster, resulting in missing the chance of capturing the damaged monster.

Figure 6:
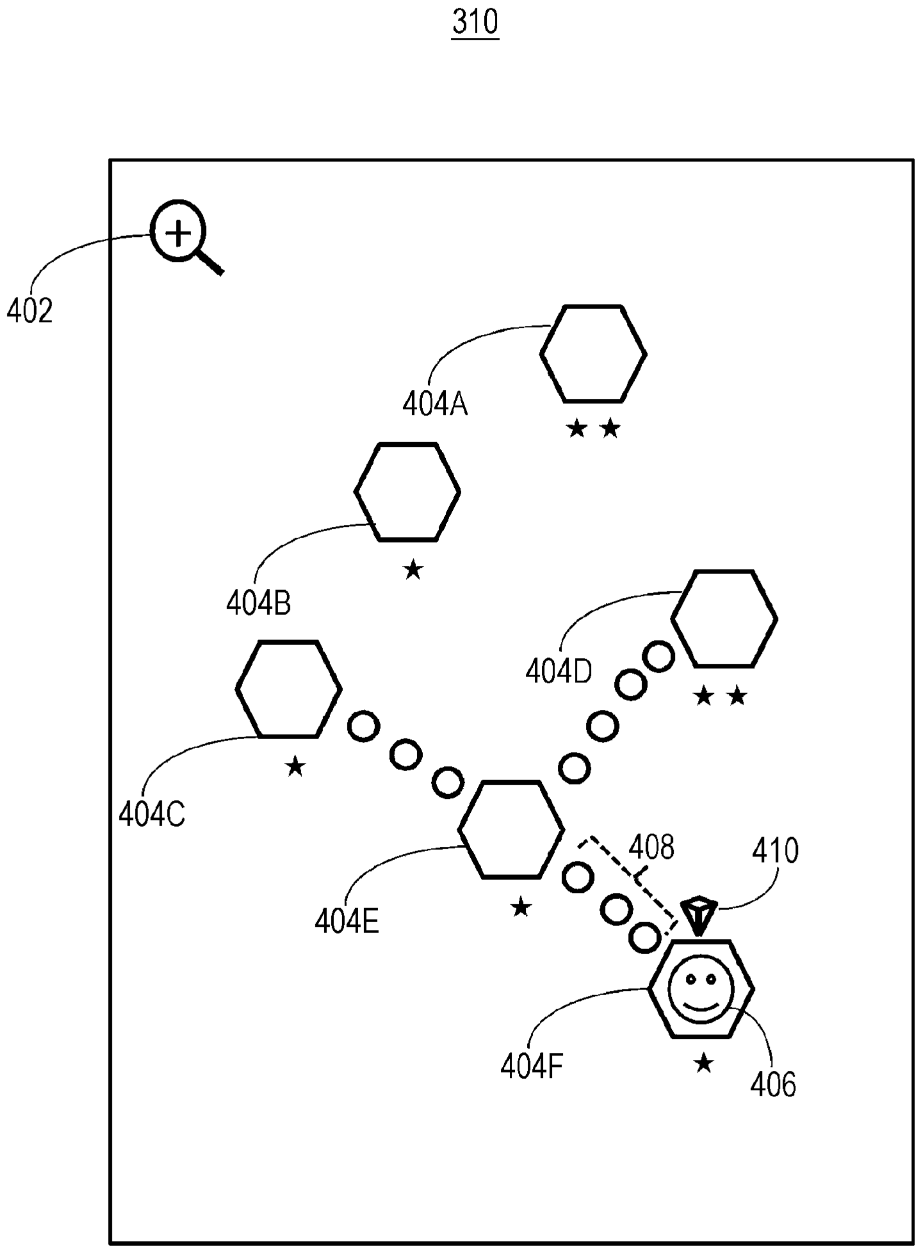
FIG. 6 is a diagram illustrating a first screen display example of a user terminal of FIG. 1.

FIG. 6 is a diagram illustrating a first screen display example 310 of the user terminal of FIG. 1. When the user starts a game (quest) by operating the user terminal, the first screen display example 310 of FIG. 6 is displayed. The first screen display example 310 is a screen displayed after the start of the game, and is the entire map showing a stage including a plurality of game areas. In the first screen display example 310 there are displayed a zoom-in/out button 402, a first area 404A to a sixth area 404F which are represented by an area 404, a user's character 406, routes 408, and an area selection means 410.

The area 404 is a game area displayed in hexagonal form. The number of stars displayed under the hexagon indicates the difficulty level of the area 404, and the larger the number of stars, the higher the difficulty level. The user's character 406 is an image indicating a character operated by the user. As illustrated in the drawing, the user's character 406 may be displayed superimposed on the area 404.

Each route 408 indicates a route that links a plurality of areas 404. The first screen display example 310 shows that the third area 404C, the fourth area 404D, and the sixth area 404F have routes with the fifth area 404E. The routes 408 indicate those areas 404 that can be selected by the user. Hence, in the first screen display example 310, the first area 404A and the second area 404B that do not have routes 408 cannot be selected. A route 408 is newly created based on the conditions set for each area, e.g., the number of conquered areas, the number of captured monsters, etc. The conditions for this creation become more difficult depending on the difficulty level, i.e., the number of stars, for each area 404.

The area selection means 410 is a pointer indicating a game area that the user is going to select. By moving the pointer, the user can select a game area where a quest is to be performed.

The zoom-in/out button 402 is a button for zooming in or out the entire map. By the user touching a location where the button is displayed, the entire map is zoomed in or out. When the user touches the zoom-in/out button 402 on the screen in the first screen display example 310, a second screen display example 320 where a part of the entire map is displayed is displayed.

Figure 7:
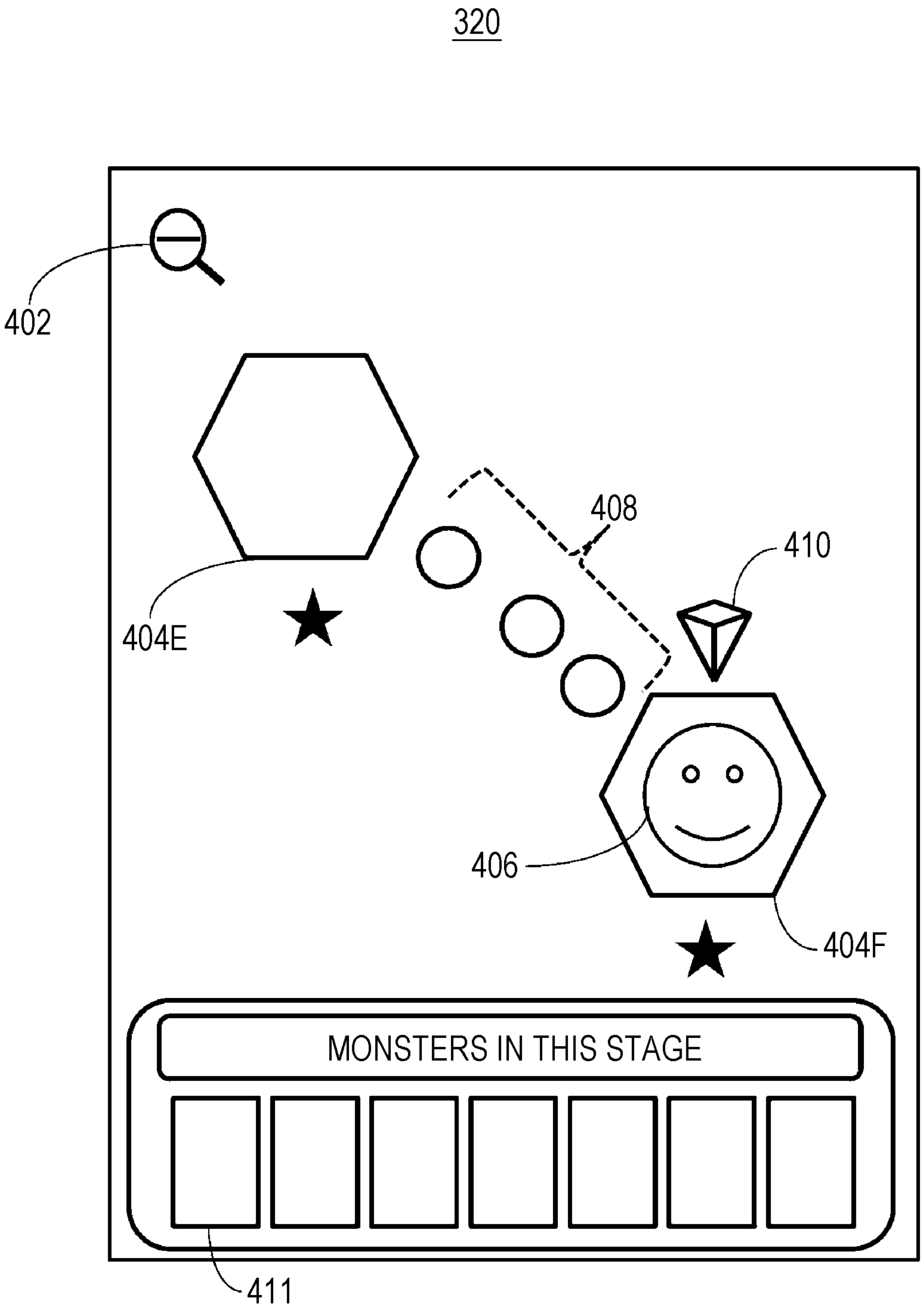
FIG. 7 is a diagram illustrating a second screen display example of the user terminal of FIG. 1.

FIG. 7 is a diagram illustrating the second screen display example 320 of the user terminal of FIG. 1. The second screen display example 320 is a screen where a region including the fifth area 404E and the sixth area 404F which is part of display provided in the first screen display example 310 is zoomed in. The second screen display example 320 further includes monster images 411. The monster images 411 are the images of monsters present in the stage shown in the entire map.

The game world of the game of the present embodiment has a plurality of stages, and furthermore, one stage includes a plurality of game areas. Not all of the game areas are selectable from the start, and the number of selectable game areas gradually increases according to the progress of the game by the player. Specifically, when the player clears the area 404F the area 404E appears, and when the player clears the area 404E the area 404C appears. Here, the area 404D is a hidden area and is configured not to be able to be selected only by clearing the area 404E. To release the area 404D, a predetermined condition needs to be satisfied. In the present embodiment, the condition is that the number of types of captured monsters is greater than or equal to a predetermined number. For example, if the number of all types of monsters present in a certain stage is 10, then when the player has succeeded in capturing 8 or more types of monsters, the area 404D is released.

Figure 8:
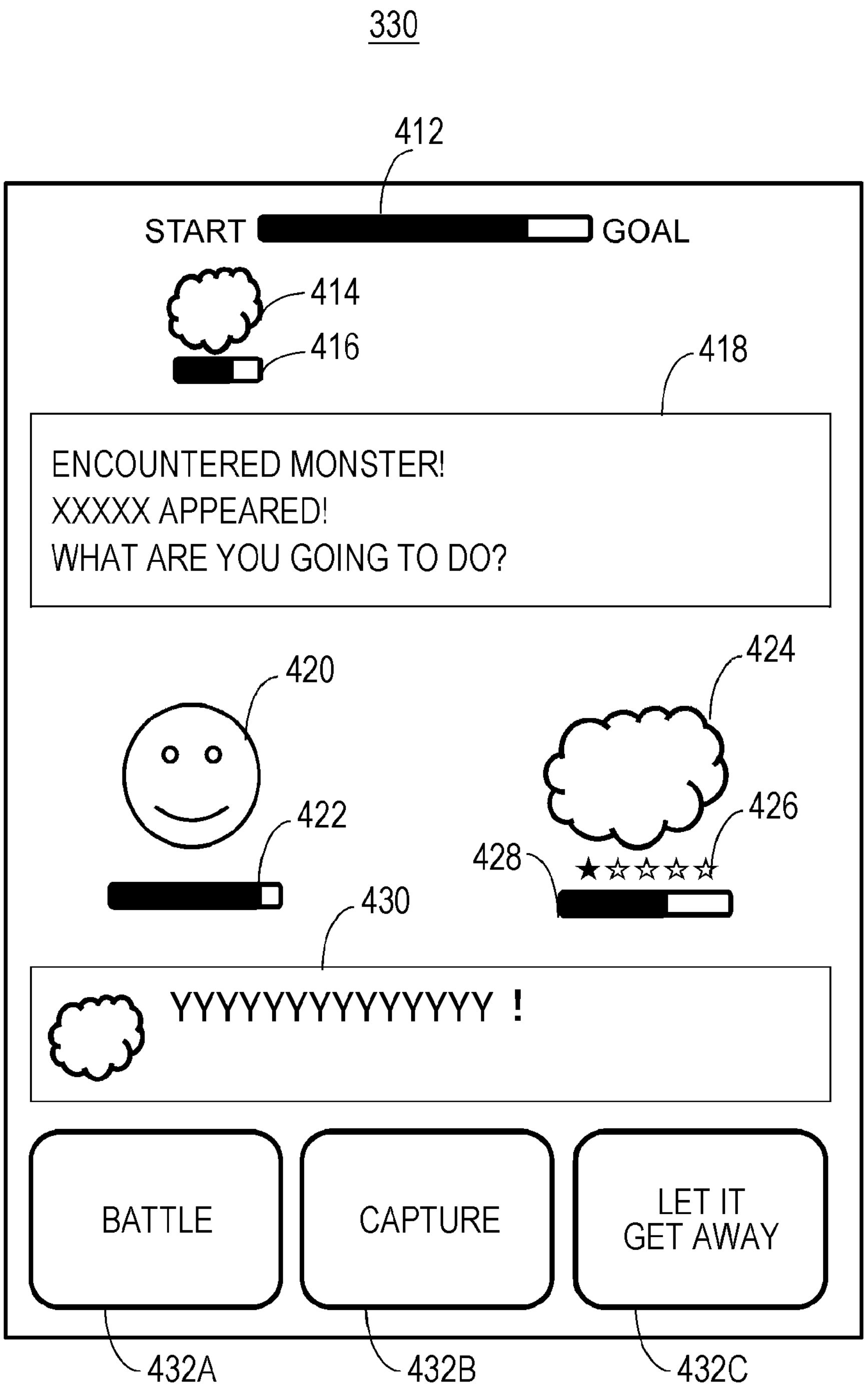
FIG. 8 is a diagram illustrating a third screen display example of the user terminal of FIG. 1.

FIG. 8 is a diagram illustrating a third screen display example 330 of the user terminal of FIG. 1. The third screen display example 330 is a screen displayed when the player encounters a monster while performing a quest, and includes a progress meter 412, an already-encountered monster image 414, an already-encountered monster status meter 416, a battle message 418, an avatar image 420, a user's character status meter 422, a monster image 424, a capture difficulty level 426, an enemy monster status meter 428, a monster message 430, and a first command button 432A to a third command button 432C which are represented by a command button 432.

The progress meter 412 is a meter indicating the degree of the progress of the quest. The already-encountered monster image 414 is the image of an enemy character that the user has encountered in the same quest. The already-encountered monster status meter 416 is a meter indicating the hit points of the enemy character obtained after battling with the enemy character that the user has encountered. When the user re-encounters this enemy character, a battle starts using the hit points indicated by the already-encountered monster status meter 416.

The battle message 418 is a message displayed when a battle starts. The avatar image 420 is the image of a character operated by the user in the game. The user's character status meter 422 is a meter indicating the hit points of the character operated by the user in the game.

The monster image 424 is the image of an encountered enemy character. The capture difficulty level 426 indicates the capture difficult level of the enemy character. The larger the number of solid stars, the higher the difficulty level. The enemy monster status meter 428 is a meter indicating the hit points of the enemy character. The monster message 430 is a message from the encountered enemy character.

The command buttons 432 are buttons for selecting commands that can be selected by the user. In the third screen display example 330, the first command button 432A is a button for an attack command for attacking the enemy character. The second command button 432B is a button for a capture command for capturing the enemy character. The third command button 432C is a button for a getaway command.

In the third screen display example 330, since the user's character is superior to the enemy character, the third command button 432C is displayed as "let it get away". In the opposite case, the third command button 432C is displayed as "get away". In addition, the third command button 432C can also be a button for exercising a special skill command instead of a getaway command. In this case, the third command button 432C may display a name indicating a special skill, e.g., "poison", "charm", "sleep", etc.

Figure 9:
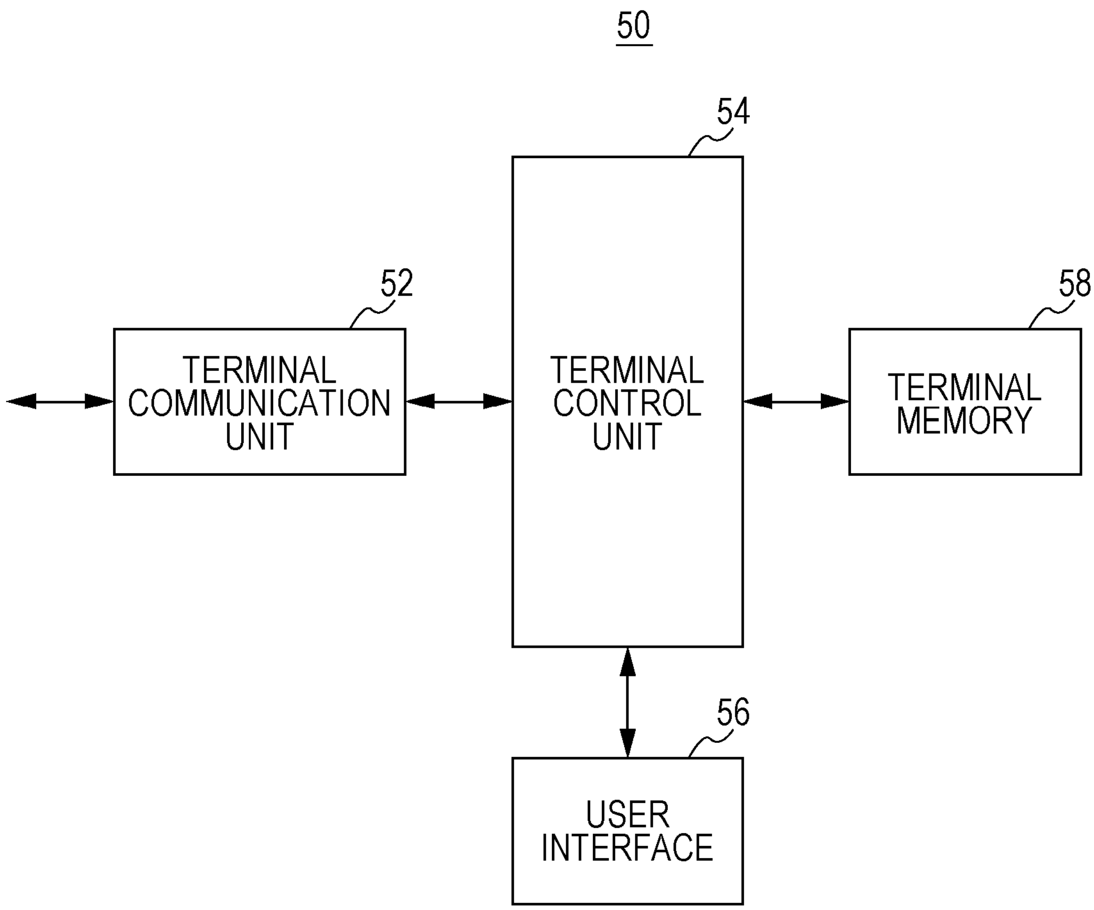
FIG. 9 is a diagram illustrating an exemplary configuration of a mobile terminal or a PC terminal of FIG. 1.

Next, a configuration of the user terminal side will be described using FIG. 9. FIG. 9 is a diagram illustrating an exemplary configuration of the mobile terminal 50 or the PC terminal 70 of FIG. 1. Here, although, for convenience of description, a configuration of the mobile terminal 50 is described, the PC terminal 70 also has the same configuration.

The mobile terminal 50 includes a terminal communication unit 52, a terminal control unit 54, a user interface 56, and a terminal memory 58. The terminal communication unit 52 receives an application downloaded from the server device 10 and various types of information transmitted from the server device 10.

The terminal control unit 54 accepts an instruction from the user through the user interface 56, and performs application install control, social game execution control, etc., while accessing the terminal memory 58.

The user interface 56 includes a screen interface for displaying a message to the user and various types of screens such as a battle screen; an input interface that accepts an input from the user, such as a keyboard or a touch panel; and an image capturing means such as a camera.

The user interface 56 accepts, from the user, selection of a quest or selection of a command, or an input of various types of comments, an action button operation, etc., and passes it to the terminal control unit 54.

The terminal memory 58 is used to store, when an application game is downloaded from an application provision platform, an application program of the application game. In addition, in a browser game, too, the terminal memory 58 is used as a cache memory or used to temporarily save image data, etc.

Figure 10:
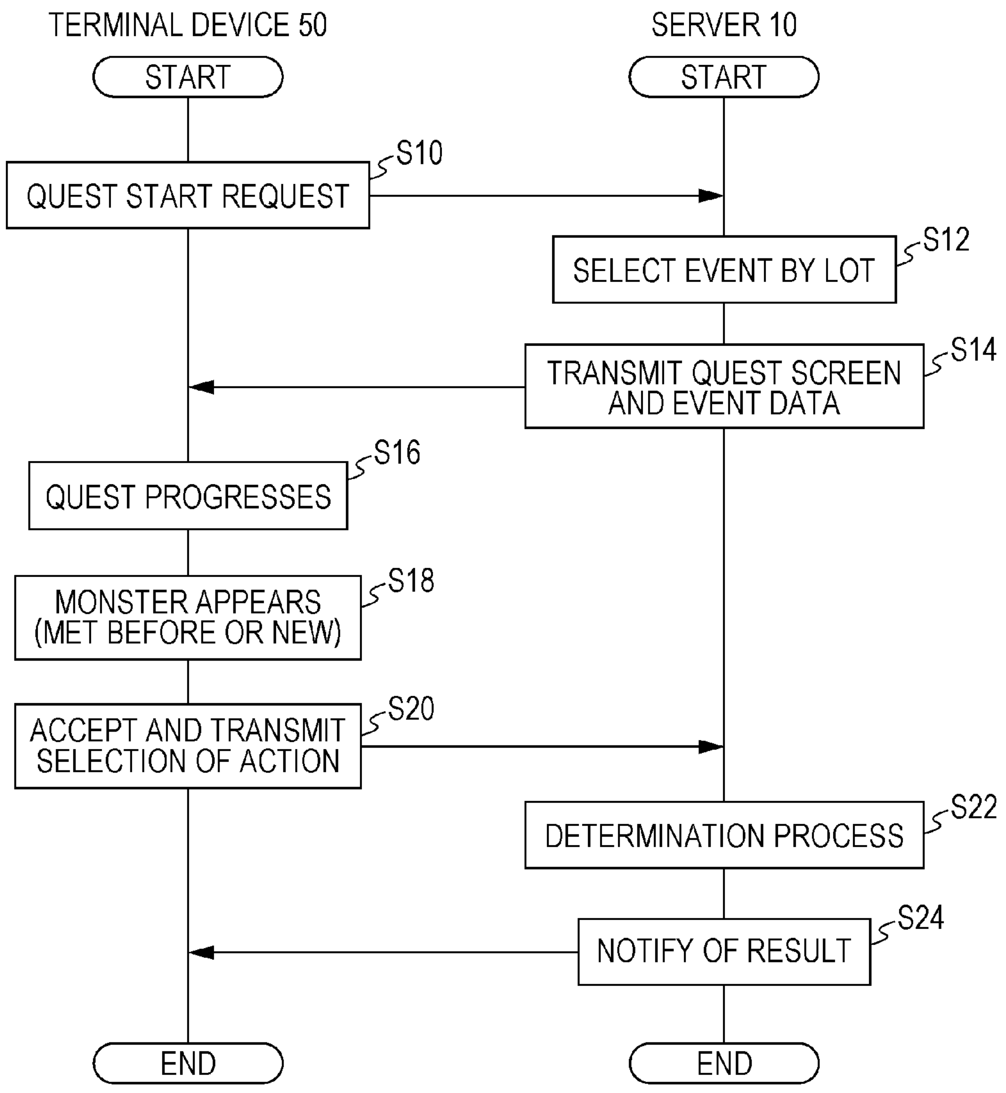
FIG. 10 is a sequence diagram illustrating a processing procedure example of the social game system of FIG. 1.

FIG. 10 is a sequence diagram illustrating a processing procedure example of the social game system 100 of FIG. 1. The sequence diagram may be performed triggered by the start of the game.

First, when the mobile terminal 50 makes a quest start request (S10), the request is notified to the server device 10, by which a quest starts. When the quest starts, the server device 10 performs selection of an event by lot (S12), and performs a process for displaying a quest screen on the mobile terminal 50 and notifies the mobile terminal 50 of data on the event selected by lot (S14), and then the quest progresses on the mobile terminal 50 (S16). When an encounter event is selected as a result of the selection by lot, an enemy character is displayed as a monster on the screen of the mobile terminal 50 (S18).

Here, when the user selects a command through the user interface 56 of the mobile terminal 50, the command is notified to the server device 10 (S20). The server device 10 performs a determination process for the notified command (S22), and notifies the mobile terminal 50 of the result of the process (S24). In the determination process, in the case of an attack command, the amount of hit points to be taken away from the enemy character is determined, and in the case of a capture command, it is determined whether capture has been succeeded.

Figure 11:
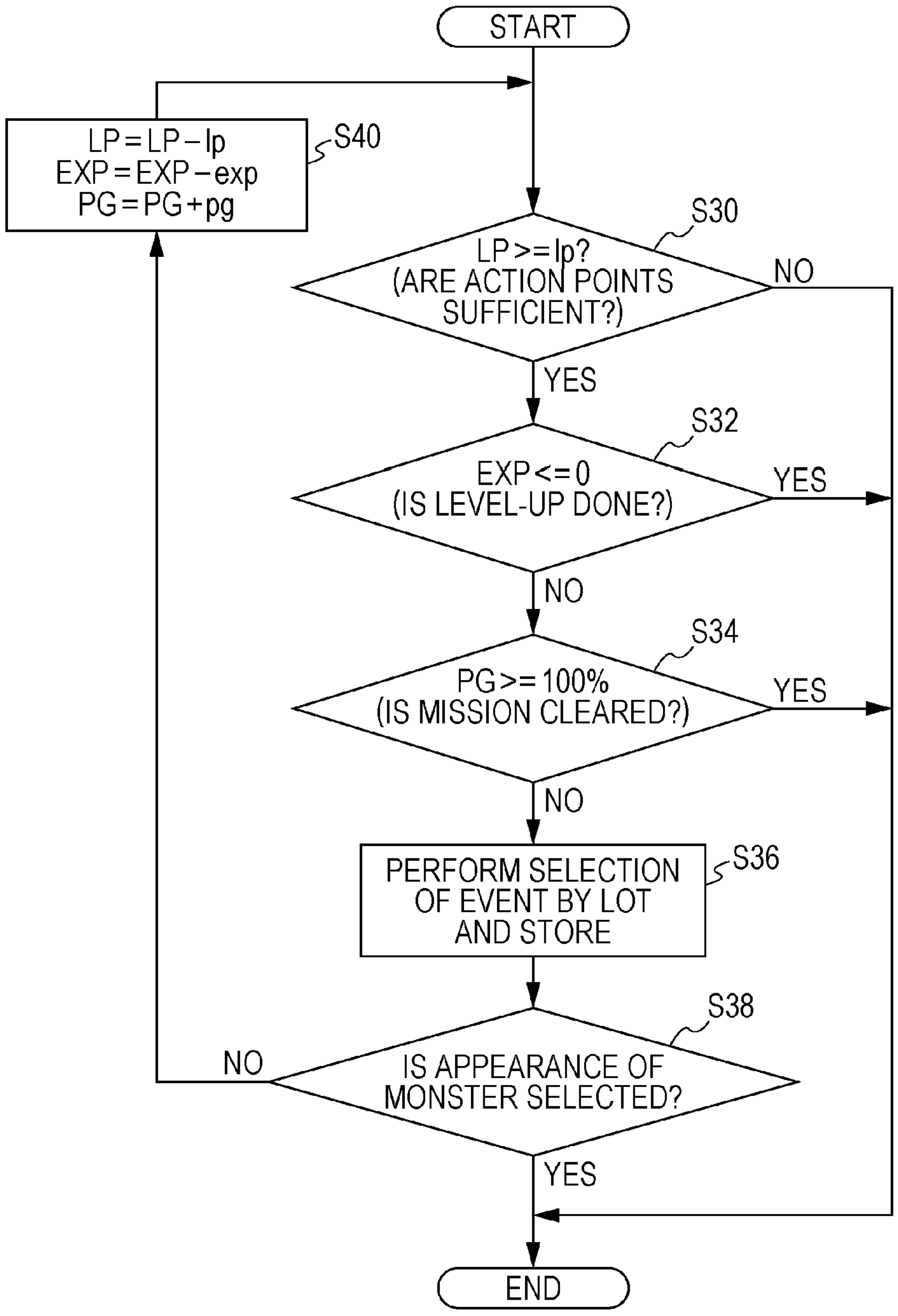
FIG. 11 is a flowchart illustrating a first processing procedure example of an event lottery unit of FIG. 2.

FIG. 11 is a flowchart illustrating a first processing procedure example of the event lottery unit 16 of FIG. 2. The flowchart may start triggered by the start of a quest. Note that in the drawing LP indicates "remaining life points", lp indicates "life points consumed per progress", EXP indicates "experience value required before the next level", exp indicates "experience value obtained per progress", PG indicates the degree of the progress of the quest with 100% being a MAX value, and pg indicates "the degree of progress (%) that increases per progress".

The event lottery unit 16 compares the life points (LP) with the points required to perform selection of an event by lot (S30). If the life points are insufficient (NO at S30), the event lottery unit 16 ends the process. If the life points are sufficient (YES at S30), the event lottery unit 16 performs an experience value determination (S32). In the experience value determination, the event lottery unit 16 determines whether the experience value required before the next level is 0 or less, i.e., whether level-up can be done.

If it is determined that level-up can be done (YES at S32), the event lottery unit 16 ends the process. If it is determined that level-up cannot be done (NO at S32), the event lottery unit 16 performs a mission clear determination (S34). In the mission clear determination, the event lottery unit 16 determines whether a mission is cleared, i.e., whether the player has reached the goal point of the quest.

If it is determined that a mission is cleared (YES at S34), the event lottery unit 16 ends the process. If it is determined that a mission is not cleared (NO at S34), the event lottery unit 16 performs selection of an event by lot and stores the result thereof (S36). If an encounter event with a monster is selected in the selection of an event by lot (YES at S38), the event lottery unit 16 ends the process. In this case, of the events selected by lot, an encounter event with a monster is the last event taken place. Upon an encounter event with a monster, there is a need to accept command selection from the player and transmit a selected command to the server device 10, and thus, it is preferred that, as described above, an encounter event with a monster be the last one of the events selected by lot. If an event other than an encounter event is selected (NO at S38), the event lottery unit 16 updates LP, EXP, and PG (S40) and returns to the process at S30.

Note that in the above-described processing procedure example, when an encounter event with a monster is selected by lot, the selection-by-lot process ends; however, the selection-by-lot process may end when an event other than an encounter event is selected by lot. For example, when an event where a treasure box is found is selected by lot, the selection-by-lot process may end. This is because when a treasure box is found, a flash movie or a treasure box obtaining status is displayed, and thus, there is a need to perform communication between the server device 10 and the mobile terminal 50.

Figure 12:
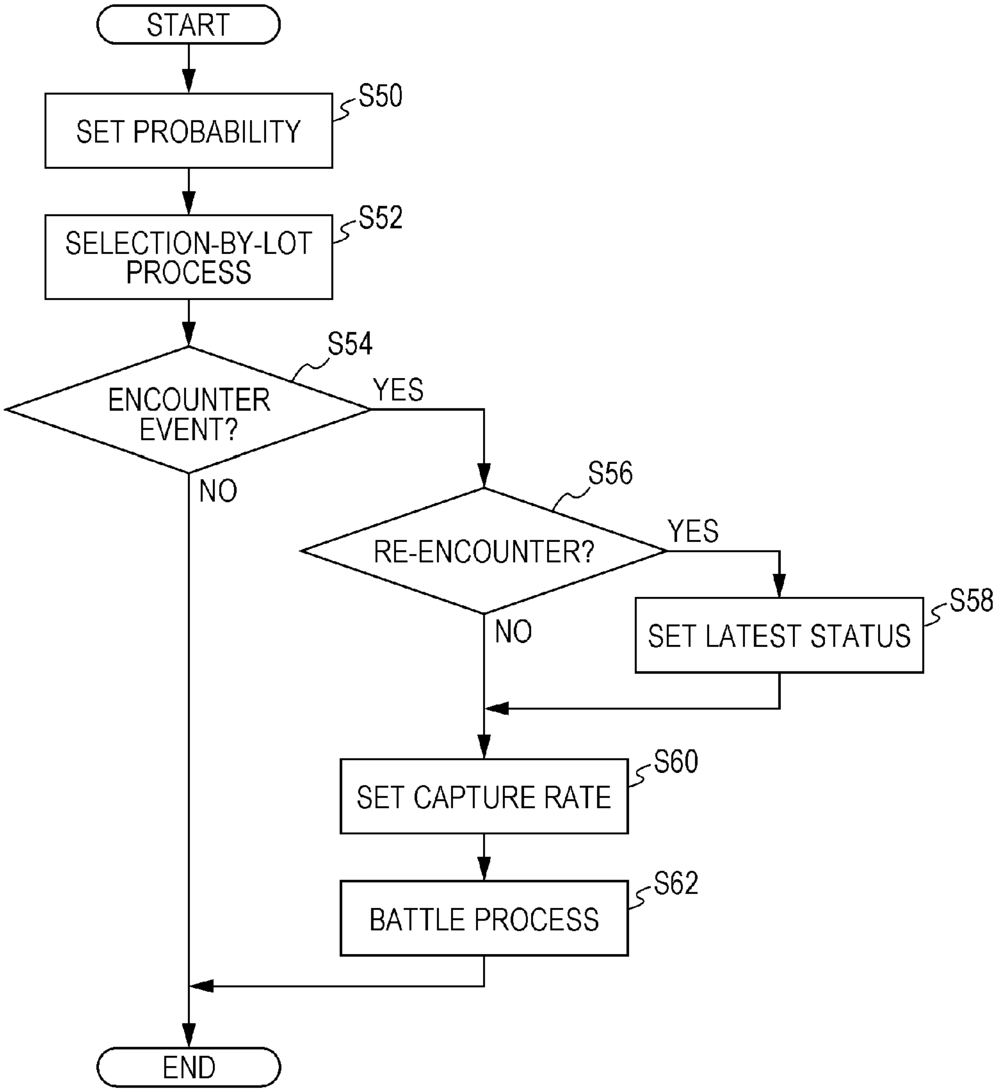
FIG. 12 is a flowchart illustrating a second processing procedure example of the event lottery unit of FIG. 2.

FIG. 12 is a flowchart illustrating a second processing procedure example of the event lottery unit 16 of FIG. 2. The flowchart may be performed when the event lottery unit 16 performs a selection-by-lot process.

First, the event lottery unit 16 sets, for each event, a probability for selecting by lot one event from among a plurality of events (S50). Then, the event lottery unit 16 performs a selection-by-lot process based on the set probabilities (S52). If an event other than an encounter event is selected as a result of the selection by lot (No at S54), the event lottery unit 16 ends the process.

If an encounter event is selected (Yes at S54), the event lottery unit 16 selects an enemy character to be encountered. If the encounter with the selected enemy character is the first encounter (No at S56), the event lottery unit 16 moves to the process at S60. If the encounter is a re-encounter (Yes at S56), the event lottery unit 16 sets, as an initial value, the latest status of the enemy character obtained upon the end of the last battle (S58), and moves to the process at S60.

Then, the event lottery unit 16 sets the capture rate for the encountered enemy character (S60), and waits for a command for starting a battle to be notified from the user, and then performs a battle process (S62). Note that the processes at S60 and S62 do not need to be included in the selection-by-lot process. In that case, when an encounter event with an enemy character takes place on the mobile terminal side and the selection of "capture" is received as a player's command selection, the game processing unit 20 may compute the capture rate and perform a battle process. When the selection of "battle" is received as a player's command selection, the game processing unit 20 may perform a battle process without computing the capture rate.

Variants of the first embodiment will be described below.

Although in the above-described embodiment it is premised that one character is operated, the configuration is not limited thereto, and a plurality of, e.g., four, characters may be operated. In this case, it may be configured such that the characters can be equipped with up to three monsters captured in the past, as their friend characters.

When, though the user has encountered an enemy character, the user has not been able to defeat the enemy character or the user has failed in capturing the enemy character and thus missed the enemy character, the user can transmit information on the finding of the enemy character to another player (player's friend, etc.). In this transmission, another player may be notified through the game processing unit 20 of the server device 10, by the user selecting a share command. The player having received the information on the finding of a monster can easily encounter the monster, enabling to increase the chance of capturing the monster.

At this time, the game processing unit 20 may perform control such that the friend player having received the information on the finding of a monster can encounter, under the condition of within a predetermined period of time, the monster whose status is the one obtained at the time of being missed by the player providing the information. Then, when the friend player has succeeded in capturing the monster, the friend player can acquire the monster, and also the game processing unit 20 may provide the player providing the information with some kind of reward (in-game currency, an item, a monster captured by the friend player, etc.).

The capture determining unit 22 may perform setting such that the probability of an encounter with a monster or the capture success rate of a monster changes depending on the character going on to a quest. These probabilities may change depending on the chemistry between a character and a monster.

Upon capturing a monster, the user may use a capture material. A capture material may have ranks (capture material (N), capture material (R), etc.) and may be selected by the user following the selection of a capture command. The capture determining unit 22 may perform setting such that the capture success rate changes depending on the rank of a capture material used to capture a monster.

In addition, the game processing unit 20 may allow a plurality of monsters to appear. When the user attempts to capture a plurality of monsters, he/she may succeed in capturing the plurality of monsters.

In addition, the game processing unit 20 may extend a quest even if a predetermined game area is cleared. For example, a quest extension item is allowed to appear in the game, and a quest is extended by the user using the quest extension item. The quest extension item is available by, for example, defeating an enemy character in a battle, or performing a quest, or purchasing it at a shop using in-game currency. When a game area is cleared, the status of an enemy character encountered in the game area is also cleared. Therefore, when there is an enemy character hunted down in the game area, by the user extending the quest, he/she can get an opportunity to capture the enemy character in a more advantageous state.

When the player uses a quest extension item, the quest is extended by reducing the degree of the progress of the quest by, for example, reducing the degree of the progress of the quest (PG) or pg by half. The quest extension item may be allowed to be used immediately after the game area is cleared (i.e., immediately after PG reaches 100%), or during a period during which the quest is performed and which is before clearing the game area (when PG is less than 100%).

Note that some or all of the above-described processes performed by the server device 10 may be performed by the user terminal.

The present invention has been described above based on the embodiment. The present invention is not limited to the above-described embodiment and the content of each embodiment, and may be performed by making various modifications therein without departing from the spirit and scope of the present invention. It will be understood by those skilled in the art that the above-described embodiment is illustrative, and thus, various variants may be made by combining the components or processing processes of the embodiment, and such variants also fall within the spirit and scope of the present invention.

What is claimed is:

1. A server device that provides a predetermined network game to a user through a communication line, the server device comprising:

a processor; and a memory configured to store one or more units that when executed by the processor, implements:

an event lottery unit that selects by lot one event from among a plurality of events including an encounter event with an enemy character present in a predetermined area in the network game;

a command accepting unit that accepts from the user a command indicating action taken on the enemy character, when the encounter event is selected by lot by the event lottery unit;

a game processing unit that performs a process on the enemy character, based on the command accepted by the command accepting unit;

wherein the memory stores a status of the enemy character obtained after processed by the game processing unit; and a capture determining unit that determines, according to a predetermined capture success rate, whether capture of the enemy character has been succeeded, when the command accepting unit accepts a capture command from the user, wherein the event lottery unit selects by lot an encounter event for re-encountering an enemy character encountered in past, with a predetermined probability, the game processing unit reads from the memory a latest status of the re-encountered enemy character and sets the latest status as an initial status of the re-encountered enemy character, and the capture determining unit sets a higher capture success rate for a re-encounter than a capture success rate for a first encounter.

2. The server device according to claim 1, wherein when a plurality of enemy characters are present in the area, the memory stores an encountered enemy character, and the event lottery unit sets a probability of selecting by lot an encounter event with each enemy character, according to a number of encounters.

3. A server device that provides a predetermined network game to a user through a communication line, the server device comprising:

a processor; and a memory storing units that when executed by the processor, implements:

an event lottery unit that selects by lot one event from among a plurality of events including an encounter event with an enemy character present in a predetermined area in the network game;

a command accepting unit that accepts from the user a command indicating action taken on the enemy character, when the encounter event is selected by lot by the event lottery unit;

a game processing unit that performs a process on the enemy character, based on the command accepted by the command accepting unit; and wherein the memory stores a status of the enemy character obtained after the processing by the game processing unit, the status of the enemy character comprising hit points of the enemy character;

wherein the event lottery unit selects by lot an encounter event for re-encountering an enemy character encountered in past, with a predetermined probability, the game processing unit reads from the memory a latest status of the re-encountered enemy character and sets the latest status as an initial status of the re-encountered enemy character, the latest status representative of a status of a re-encountered enemy character from a previous battle, when a plurality of enemy characters are present in the area, the memory stores an encountered enemy character, and the event lottery unit sets a probability of selecting by lot an encounter event with each enemy character, according to a number of encounters.

4. The server device according to claim 1, wherein when the command accepting unit accepts an attack command from the user, the game processing unit reduces hit points of the enemy character, according to attack action, the memory stores the hit points of the enemy character obtained after attacked, and the capture determining unit sets a higher capture success rate for fewer hit points of the enemy character.

5. The server device according to claim 1, wherein when the command accepting unit accepts from the user a command indicating action taken on the enemy character, the game processing unit causes a status abnormality in the enemy character with a predetermined probability, and the capture determining unit changes a capture success rate of the enemy character, according to the status abnormality.

6. The server device according to claim 1, wherein for a re-encounter, the capture determining unit sets a higher capture success rate for shorter time elapsed since a last encounter.

7. The server device according to claim 1, wherein the game processing unit:

performs, when the user uses an extension item for extending a quest after ending a quest in the area or when the user uses the extension item during the quest in the area, an extension process for the quest in the area; and brings a status of an enemy character that the user has encountered in the quest back to a status obtained before starting the quest, when the extension item is not used or the extension process ends, the status of the enemy character being stored in the memory.

8. A non-transitory computer-readable storage medium storing a game program for providing a network game to a user, the program causing a computer to perform:

selecting by lot one event from among a plurality of events including an encounter event with an enemy character present in a predetermined area in the network game;

accepting from the user a command indicating action taken on the enemy character, when the encounter event is selected by lot;

a process on the enemy character, based on the accepted command; and storing a status of the enemy character obtained after the process on the enemy character, the status of the enemy character comprising hit points of the enemy character, wherein in the selection-by-lot, an encounter event for re-encountering an enemy character encountered in past is selected by lot with a predetermined probability, in the processing, a latest status of the re-encountered enemy character is read from the memory, and the latest status is set as an initial status of the re-encountered enemy character, the latest status representative of a status of a re-encountered enemy character from a previous battle, in the storing, when a plurality of enemy characters are present in the area, an encountered enemy character is stored, and in the selection-by-lot, a probability of selecting by lot an encounter event with each enemy character is set according to a number of encounters.

* * * * *